United States Patent
McMeekin et al.

(10) Patent No.: US 12,378,937 B1
(45) Date of Patent: Aug. 5, 2025

(54) PRE-IGNITION PREVENTION USING ION SENSE DETECTION OF EXHAUST STROKE HEAT RELEASE FOR DUAL SPARK PLUG ENGINES

(71) Applicant: FCA US LLC, Auburn Hills, MI (US)

(72) Inventors: Michael S McMeekin, Auburn Hills, MI (US); William P Attard, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/808,673

(22) Filed: Aug. 19, 2024

(51) Int. Cl.
| F02P 5/15 | (2006.01) |
| F02P 9/00 | (2006.01) |
| F02P 11/00 | (2006.01) |

(52) U.S. Cl.
CPC ............... F02P 5/15 (2013.01); F02P 9/002 (2013.01); F02P 11/00 (2013.01)

(58) Field of Classification Search
CPC .... F02P 15/02; F02B 2023/185; F02D 35/021
USPC ....... 123/113, 253, 310, 638, 406.14, 406.27
See application file for complete search history.

(56) References Cited

U.S. PATENT DOCUMENTS

| 5,619,968 | A | * | 4/1997 | Hillsberg | ............... | F02P 5/1518 |
| | | | | | | 123/406.62 |
| 7,475,669 | B2 | | 1/2009 | Maeda | | |
| 9,038,596 | B2 | * | 5/2015 | Glugla | ................... | F02D 17/02 |
| | | | | | | 123/406.27 |
| 11,255,240 | B1 | | 2/2022 | Glugla et al. | | |
| 2004/0084018 | A1 | * | 5/2004 | Zhu | ...................... | F02D 41/1482 |
| | | | | | | 123/406.47 |
| 2005/0056254 | A1 | * | 3/2005 | Wozniak | ............... | F02P 5/1525 |
| | | | | | | 123/406.13 |
| 2012/0180756 | A1 | * | 7/2012 | Estefanous | ........... | F02D 35/028 |
| | | | | | | 123/294 |
| 2014/0379242 | A1 | * | 12/2014 | Henein | ................. | F02D 35/023 |
| | | | | | | 701/104 |

FOREIGN PATENT DOCUMENTS

| CN | 116771486 A | | 9/2023 |
| EP | 3001008 A1 | | 3/2016 |
| JP | 59221423 A | * | 12/1984 |
| JP | 2023015623 A | * | 2/2023 |

* cited by examiner

Primary Examiner — Logan M Kraft
Assistant Examiner — Joshua Campbell
(74) Attorney, Agent, or Firm — Jeremy J. Klobucar

(57) ABSTRACT

A pre-ignition prevention system for a turbulent jet ignition (TJI) engine having dual spark plugs includes an ion sensing system and a controller configured to receive the ion sense signal from the ion sensing system, detect, using the ion sense signal, a misfire event where a firing of a first spark plug fails to completely combust a fuel/air pre-charge in a pre-chamber of a cylinder of the TJI engine, in response to detecting the misfire event, detect, using the ion sense signal, an exhaust stroke heat release event after a firing of the second spark plug indicative of a remaining portion of a primary fuel/air charge in the main chamber and, in response to detecting the exhaust stroke heat release event, adjust fueling for at least one subsequent combustion cycle to prevent pre-ignition of the remaining portion of the primary fuel/air charge in the main chamber.

18 Claims, 3 Drawing Sheets

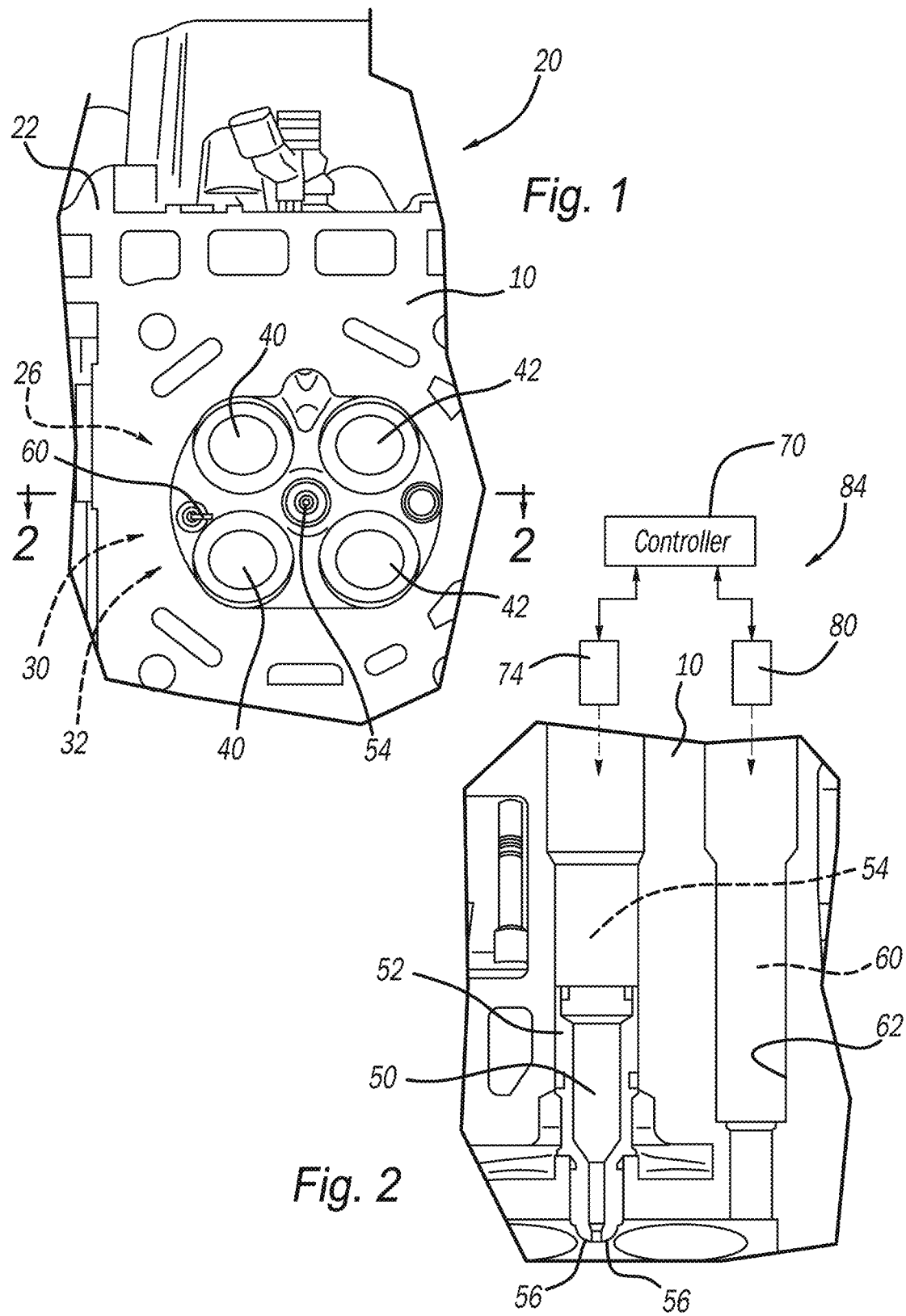

PRE-IGNITION PREVENTION USING ION SENSE DETECTION OF EXHAUST STROKE HEAT RELEASE FOR DUAL SPARK PLUG ENGINES

FIELD

The present application generally relates to spark ignition (SI) engines and, more particularly, to techniques for preventing pre-ignition using ion sense detection of exhaust stroke heat release in dual spark plug SI engines.

BACKGROUND

In today's internal combustion engines, the spark timing with respect to the respective piston strokes affects the quality of combustion. It is therefore desirable to accurately determine and control the spark timing because poor combustion quality due to inaccurate spark timing could result in decreased fuel economy and/or engine knock. An internal combustion engine that incorporates turbulent jet ignition (TJI) includes a pre-chamber with a first spark plug inside and installed generally in the center of the cylinder head. A second spark plug is mounted in an offset position in the main combustion chamber. The pre-chamber typically connects to the main combustion chamber with multiple fluid passages. Ignition of a fuel/air pre-charge is initiated inside the pre-chamber and jets of hot gasses enter into the main combustion chamber to ignite a primary fuel/air charge.

In such TJI type engines, there exists both a pre-chamber ignition from the first spark plug and a secondary ignition in a main combustion chamber from the second spark plug. When a TJI engine experiences a misfire, a partial burn of the primary fuel/air charge can occur. A partially combusted primary fuel/air charge that remains in the main chamber has high ignitability and can lead to pre-ignition on the following combustion cycle, which could potentially damage the engine. Conventional misfire detection solutions detect misfires of the primary fuel/air charge in the combustion chamber, but there are no existing solutions to eliminate partial late combustions that can cause damaging pre-ignition on a subsequent combustion cycle. Accordingly, an opportunity exists for improvement in the relevant art.

SUMMARY

According to one example aspect of the invention, a pre-ignition prevention system for a turbulent jet ignition (TJI) engine having dual spark plugs is presented. In one exemplary implementation, the pre-ignition prevention system comprises an ion sensing system configured to generate an ion sense signal indicative ion flow between electrodes of each of first and second spark plugs of the TJI engine, the first and second spark plugs being associated with a pre-chamber and a main chamber, respectively, of a cylinder of the TJI engine and a controller configured to receive the ion sense signal from the ion sensing system, detect, using the ion sense signal, a misfire event where a firing of the first spark plug fails to completely combust a fuel/air pre-charge in the pre-chamber, in response to detecting the misfire event, detect, using the ion sense signal, an exhaust stroke heat release event after a firing of the second spark plug indicative of a remaining portion of a primary fuel/air charge in the main chamber, and in response to detecting the exhaust stroke heat release event, adjust fueling for at least one subsequent combustion cycle to prevent pre-ignition of the remaining portion of the primary fuel/air charge in the main chamber.

In some implementations, the controller is configured to adjust the fueling by decreasing a fuel/air ratio of the TJI engine or decreasing a quantity of fuel injected into the TJI engine. In some implementations, the controller is configured to adjust the fueling by temporarily disabling fueling to the TJI engine. In some implementations, the controller is configured to adjust the fueling by increasing a fuel/air ratio of the TJI engine or increasing a quantity of fuel injected into the TJI engine. In some implementations, the controller is configured to adjust the fueling for a calibrated number of subsequent combustion cycles, and wherein the calibrated number of subsequent combustion cycles is calibrated to ensure that the remaining portion of the primary fuel/air charge in the main chamber is completely combusted.

In some implementations, the controller is configured to extend a monitoring window for the ignition sense signal to include a period after the firing of the second spark plug in order to monitor for the exhaust stroke heat release event. In some implementations, the exhaust stroke heat release event corresponds to a late cycle partial combustion of the primary fuel/air charge, and wherein the late cycle partial combustion of the primary fuel/air charge results in an incomplete combustion of the primary fuel/air charge and the remaining portion of the primary fuel/air charge. In some implementations, the pre-ignition of the remaining portion of the primary fuel/air charge causes excessive vibration that could potentially damage the TJI engine. In some implementations, the TJI engine is a four-cylinder turbocharged engine.

According to another example aspect of the invention, a pre-ignition prevention method for a TJI engine having dual spark plugs is presented. In one exemplary implementation, the pre-ignition prevention method comprises generating, by an ion sensing system, an ion sense signal indicative ion flow between electrodes of each of first and second spark plugs of the TJI engine, the first and second spark plugs being associated with a pre-chamber and a main chamber, respectively, of a cylinder of the TJI engine, receiving, by a controller of the TJI engine, the ion sense signal from the ion sensing system, detecting, by the controller and using the ion sense signal, a misfire event where a firing of the first spark plug fails to completely combust a fuel/air pre-charge in the pre-chamber, in response to detecting the misfire event, detecting, by the controller and using the ion sense signal, an exhaust stroke heat release event after a firing of the second spark plug indicative of a remaining portion of a primary fuel/air charge in the main chamber, and in response to detecting the exhaust stroke heat release event, adjusting, by the controller, fueling for at least one subsequent combustion cycle to prevent pre-ignition of the remaining portion of the primary fuel/air charge in the main chamber.

In some implementations, the adjusting of the fueling includes decreasing a fuel/air ratio of the TJI engine or decreasing a quantity of fuel injected into the TJI engine. In some implementations, the adjusting of the fueling includes temporarily disabling fueling to the TJI engine. In some implementations, the adjusting of the fueling includes increasing a fuel/air ratio of the TJI engine or increasing a quantity of fuel injected into the TJI engine. In some implementations, the adjusting of the fueling is performed for a calibrated number of subsequent combustion cycles, and wherein the calibrated number of subsequent combustion cycles is calibrated to ensure that the remaining portion of the primary fuel/air charge in the main chamber is completely combusted.

In some implementations, the pre-ignition prevention method further comprises extending, by the controller, a monitoring window for the ignition sense signal to include a period after the firing of the second spark plug in order to monitor for the exhaust stroke heat release event. In some implementations, the exhaust stroke heat release event corresponds to a late cycle partial combustion of the primary fuel/air charge, and wherein the late cycle partial combustion of the primary fuel/air charge results in an incomplete combustion of the primary fuel/air charge and the remaining portion of the primary fuel/air charge. In some implementations, the pre-ignition of the remaining portion of the primary fuel/air charge causes excessive vibration that could potentially damage the TJI engine. In some implementations, the TJI engine is a four-cylinder turbocharged engine.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

BRIEF DESCRIPTION OF THE DRAWINGS

FIG. 1 is a side view of a cylinder head of an example turbulent jet ignition (TJI) engine according to the principles of the present application;

FIG. 2 is a cross-sectional view of the example TJI engine taken along lines 2-2 of FIG. 1 according to the principles of the present application;

DETAILED DESCRIPTION

Figure 3:
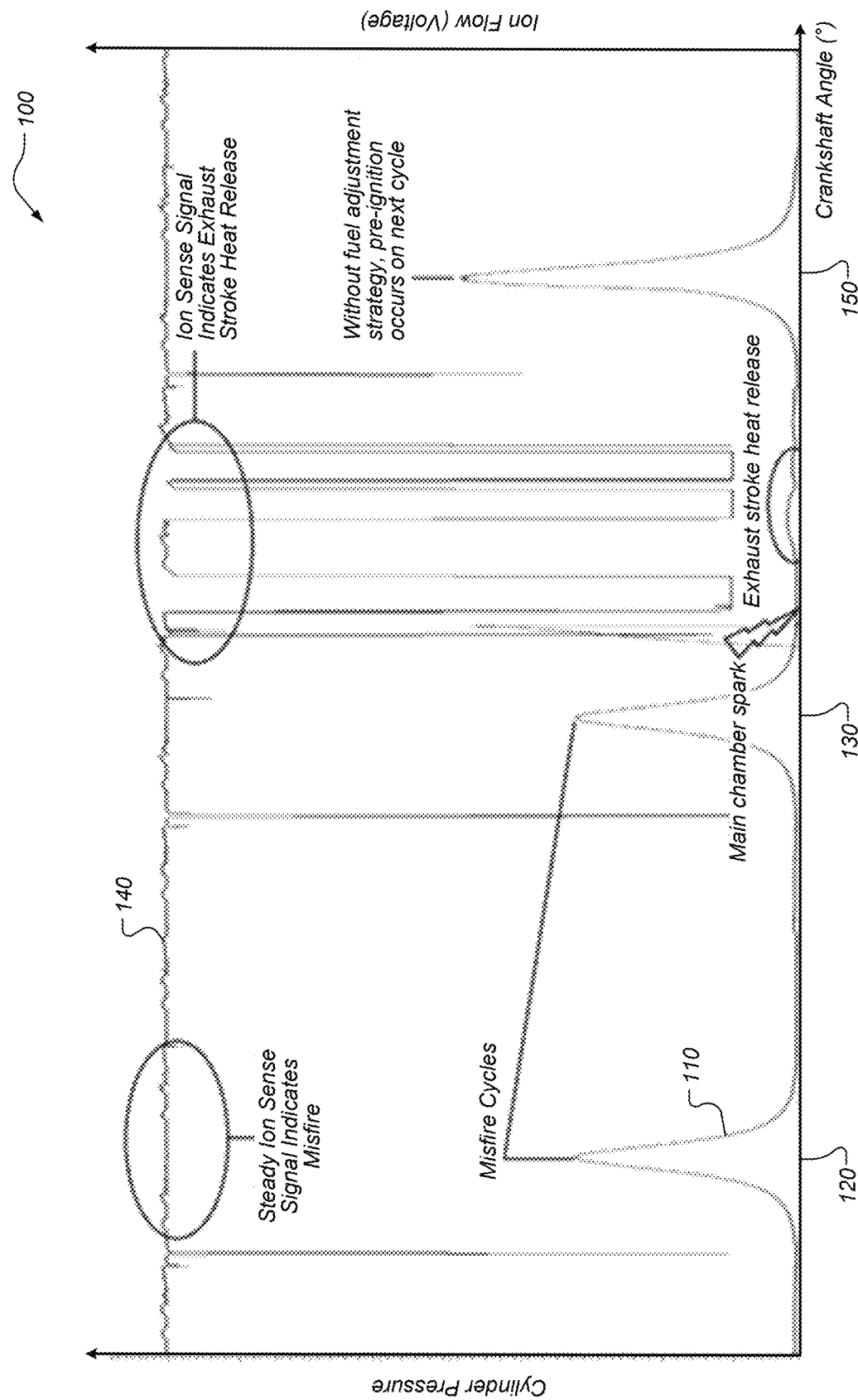
FIG. 3 is an example plot of crankshaft angle versus pressure for a TJI engine cylinder illustrating a misfire event and a resulting exhaust stroke heat release indicated by an ion sense signal and a subsequent pre-ignition that needs to be eliminated according to the principles of the present application.

As previously discussed, conventional control techniques for TJI engines having dual spark plugs (pre-chamber and main chamber) associated with each cylinder reduce the frequency of misfire events but do not completely eliminate the problem. Thus, conventional TJI engines still can suffer from pre-ignition during combustion cycles after misfire events, which could potentially damage the TJI engine or its components. Accordingly, systems and methods for preventing pre-ignition via ion sense detection of exhaust stroke heat release in TJI engines having dual spark plugs are presented herein. These techniques effectively expand the ion sense window to include a calibratable period after the main chamber spark plug is fired. The ion sense signal is first used to determine if the pre-chamber spark plug firing has successfully initiated combustion or misfired. When a misfire is detected, the ion sense signal will continue to be monitored until after the main chamber spark plug fires. If the ion sense signal indicates that the main chamber spark plug has initiated a partial combustion late in the cycle as evidenced by exhaust stroke heat release, the fueling will be altered for a next calibratable number of cycles (change fuel/air ratio, disable fueling, etc.) to prevent pre-ignition.

Referring now to FIGS. 1-2, side (elevational) and cross-sectional views of a cylinder head 10 of an example TJI engine 20 according to the principles of the present application are illustrated. The cylinder head 10 is incorporated into the TJI engine 20 having an engine block 22 incorporating one or more cylinders 26. The TJI engine 20 can be part of a powertrain of a vehicle (not shown), in which the TJI engine 20 generates drive torque that is transferred to a driveline (axles, wheels, etc.) via a transmission (e.g., a multi-speed step gear automatic transmission). A piston 30 is connected to a crankshaft (not shown) and is supported for reciprocal movement within a cylinder 26 defined in the engine block 22. The cylinder head 10, cylinder 26 and piston 30 cooperate to define a combustion chamber 32. As shown, the TJI engine 20 includes two intake ports 40 and two exhaust ports 42. As is known, the intake and exhaust ports 40 and 42 open and close via respective intake and exhaust valves (not shown) to provide fluid communication between the cylinder 26 and an intake manifold and an exhaust manifold (neither being specifically shown in FIG. 1). It will be appreciated that while two intake ports 40 and two exhaust ports 42 are shown, the TJI engine 20 may incorporate any number of intake and/or exhaust valves.

In one exemplary implementation, the engine block 22 can be configured to have four cylinders. It will be appreciated that the methods and control strategies discussed herein can be applicable to TJI engines having different amounts of cylinders (6, 8, 10, etc.). It will also be appreciated that the TJI engine 20 could have a forced-induction system (not shown), such as a turbocharger system, for increasing its torque output. The cylinder head 10 includes a pre-chamber 50 having a pre-chamber insert 52 disposed therein. The pre-chamber 50 is a small volume outside of a typical combustion chamber (e.g., combustion chamber 32) where combustion can be initiated. A first ignition device or pre-chamber spark plug 54 is disposed in the pre-chamber 50. The pre-chamber insert 52 defines a plurality of small orifices 56 defined therein. The orifices 56 provide communication between the pre-chamber 50 and an adjacent cavity (a main chamber 62) of the combustion chamber 32. One or more fuel injectors (not specifically referenced) are configured to deliver fuel into the combustion chamber 32 of the cylinder 26 (e.g., via direct fuel injection, via port fuel injection, or some combination thereof).

The fuel in a main cavity or chamber 62 of the combustion chamber 32 forms the primary fuel/air charge, and some of the injected fuel propagates or finds its way into the pre-chamber 50 to form a fuel/air pre-charge (also known as a passive pre-chamber configuration). Alternatively, the TJI engine 20 could potentially have an active pre-chamber configuration where the pre-chamber 50 and the main chamber 62 have separate fuel injectors, although such a configuration may suffer from increased costs. The first spark plug 54 can ignite the fuel/air pre-charge in the pre-chamber 50. Hot gasses are expelled from the pre-chamber 50 and propagate through the main chamber 62, driving combustion in the cylinder 26. A second ignition device or second spark plug 60 is disposed in the main chamber 62. In some implementations the second spark plug 60 can be referred to as a side spark plug. Once ignited, the fuel is forced through the orifices 56 of the pre-chamber 50. Flame is initiated inside the pre-chamber 50 and jets into the main chamber 62 to ignite the primary fuel/air charge.

A controller 70 is configured to command firing timing signals to the first and second spark plugs 54 and 60 through respective ignition coils 74 and 80 based on sensed operating conditions and implemented firing strategies such as those described herein. The controller 70 may include an ion sense circuit or system 84 configured for misfire and exhaust stroke heat release detection and both could be components of the pre-ignition prevention system of the present application. It will also be appreciated that the ion sense circuit or system 84 could be a separate system that is separate from the controller 70. While a single controller 70 is illustrated in FIG. 1 it will be appreciated that multiple controllers and/or modules, such as a supervisory vehicle control module and engine control module can be used individually or in concert to control operation of the TJI engine 20 based on various operating conditions.

The general operation of ion sensing for misfire event detection will now be discussed in greater detail. Under normal operating conditions of the TJI engine 20, outside of wide open throttle (WOT), both of the first and second spark plugs 54 and 60 are fired. When the first and second spark plugs 54 and 60 are being fired, they are fired at offset times (e.g., at different crank angles) or as used herein, "stagger". The second spark plug 60 incorporates an ion sense feature for misfire detection. As mentioned above, an ion sense strategy is a type of misfire detection technology that uses a spark plug as a sensor. A voltage is biased across the gap between electrodes (not shown) of the second spark plug 60 when the second spark plug 60 is not sparking. The system is charged while sparking, and the system is active after the spark is gone and combustion is occurring. The ionization of the gasses (i.e., ion flow through the gasses) is sensed. In other words, the gases within the combustion chamber 62 are present in a plasma state which have charged particles (ions). The space between the electrodes is excited to be able to sense the ionization. Combustion has occurred if the ionization is sensed. If ionization is not sensed, then combustion has not happened.

As used herein, a misfire is used to denote a condition where a pre-chamber 50 does not completely light and combust the fuel/air charges for a particular cycle, thereafter causing a pre-ignition on a subsequent cycle. If a misfire occurs on a cycle where the main chamber plug 60 is being fired, a partial burn of the fuel/air charge can occur. A partially combusted fuel/air charge that remains in the main chamber 62 has high ignitability and can lead to engine damaging pre-ignition on the following combustion cycle. Pre-ignition refers to the premature ignition of a fuel/air charge. In the example TJI engine 20, pre-ignition involves the main fuel/air charge being ignited before the expected ignition via the hot gasses expelled from the pre-chamber 50 (e.g., before the first ignition in the pre-chamber 50). As previously discussed, it could be desirable to forgo firing of the second spark plug 60 at WOT as it may not be necessary to fire the second spark plug 60 at high loads for combustion requirements. However, to properly identify a misfire using the ion sense feature, the second spark plug 60 needs to be fired. The controller 70 is thus configured to monitor a longer window of the ion sense signal (from the second spark plug 60) to first detect a misfire event and thereafter detect exhaust stroke heat release, after which the controller 70 can adjust fueling (adjust the fuel/air ratio, disable fueling, etc.) for a next calibratable number of combustion cycles (1, 2, 3, etc.) to avoid pre-ignition.

Referring now to FIG. 3 and with continued reference to FIGS. 1-2, an example plot 100 illustrating a misfire event of a TJI engine cylinder (e.g., cylinder 26 of TJI engine 20) and a resulting exhaust stroke heat release indicated by an ion sense signal and a subsequent pre-ignition that needs to be eliminated according to the principles of the present application is illustrated. The plot 100 includes both a cylinder pressure trace 110 and an ion sense signal window 140. The cylinder pressure trace 110 is shown to include a first firing 120 of the pre-chamber plug 54 and a second firing 130 of the main chamber plug 60. The ion sense signal window 140 is shown to extend from the initial misfire detection (after first firing 110) until a pre-ignition during a subsequent combustion cycle. The ion sense signal window 140 is effectively maintained but extended by a calibratable amount after the firing of the main chamber plug 60. By extending the ion sense signal window 140, the exhaust stroke heat release can be identified from the ion sense signal as shown. The presence of this exhaust stroke heat release confirms the misfire event and indicates that there is resulting fuel/air mixture that could result in pre-ignition (as indicated at 150) during a subsequent combustion cycle if not handled or accounted for.

The remedial solution for handling this remaining fuel/air mixture is to adjust fueling to compensate for the remaining fuel/air mixture and prevent pre-ignition of the same. This fueling adjustment could include, for example only, decreasing a richness or fuel/air ratio of (i.e., enleanment) a subsequent fuel/air charge or reducing a subsequent amount of fuel injected. The fuel/air ratio or fuel amount decrease could be a predetermined or calibratable amount or could be dynamically determined (online) based on other operating parameters. This fueling adjustment could alternatively include completely disabling fueling (i.e., fuel shutoff) for a period. This fueling adjustment could be performed for a calibratable number of combustion cycles (e.g., one cycle or multiple cycles) to ensure that any remaining fuel/air mixture is completely consumed during subsequent combustion events. The specific fuel decrease adjustment and/or the number of combustion cycles for which to perform the fueling adjustment could vary for different TJI engine configurations and thus could involve offline testing and calibration to determine optimal values that provide the best pre-ignition prevention results while also maximizing other desired parameters such as performance and fuel economy. It will be appreciated that the fuel adjustment could also involve increasing the richness of the fuel/air ratio (i.e., enrichment) of the subsequent fuel/air charge or increasing the amount of fuel injected, depending on the situation/application.

Figure 4:
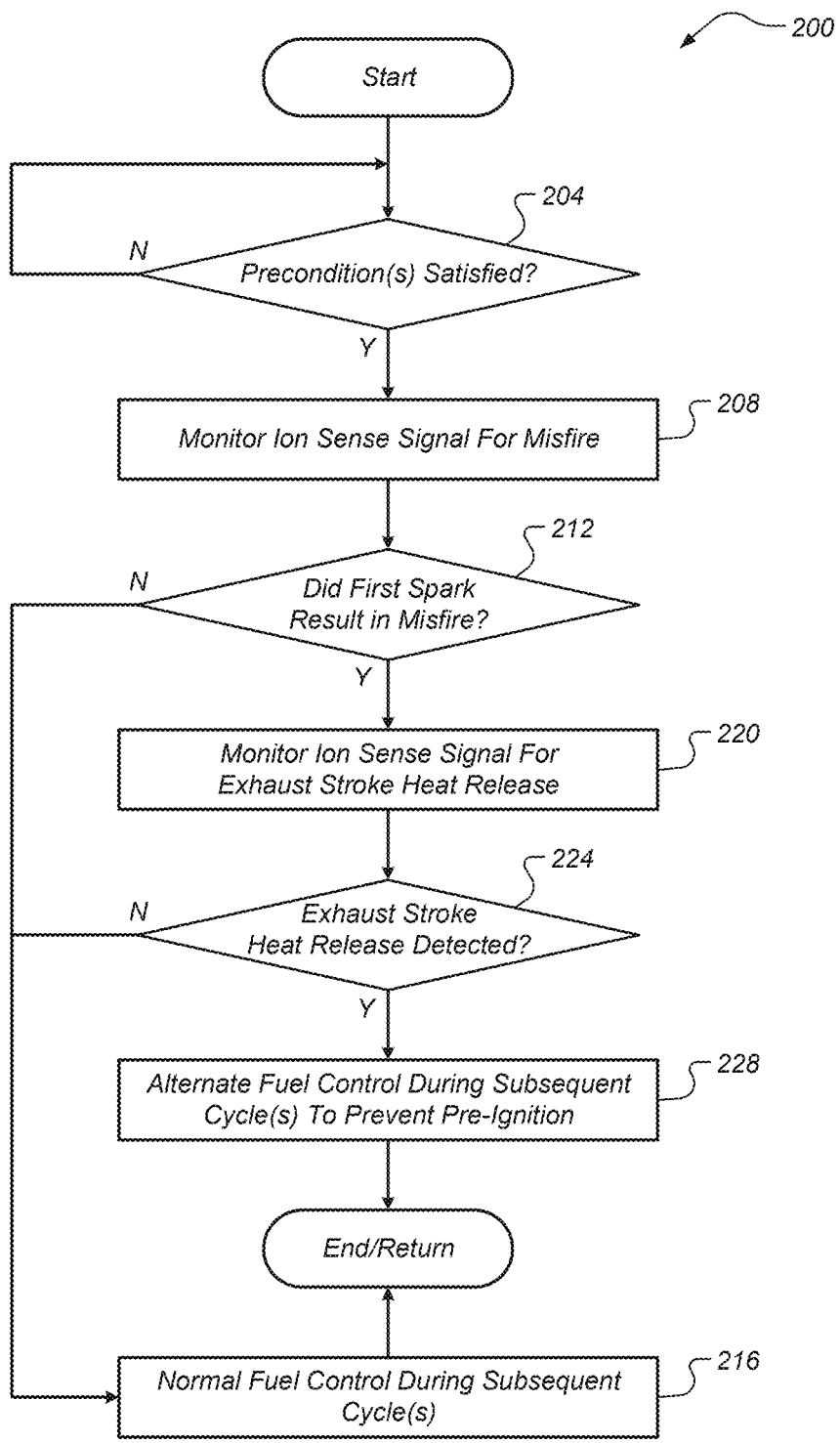
FIG. 4 is a flow diagram of an example method of ion sense detection of exhaust stroke heat release after a TJI cylinder misfire event and subsequent fuel control to prevent pre-ignition according to the present application.

Referring now to FIG. 4 and with continued reference to FIGS. 1-3, a flow diagram of a method 200 for detecting misfire in the dual spark plug engine 20 according to the principles of the present application is illustrated. While the TJI engine 20 and its components are specifically referenced for descriptive/illustrative purposes, it will be appreciated that the method 200 could be applicable to any suitable TJI engine. The method 200 begins at 204 where the controller 70 determines whether an optional set of preconditions are satisfied. These precondition(s) could include, for example only, the TJI engine 20 being powered up and running and there being no malfunctions or faults present (e.g., malfunctions of the ion sensing system 84) that would inhibit or otherwise negatively impact the operation of the techniques of the present application. When false, the method 200 ends or returns to 204. When true, the method 200 proceeds to 208. At 208, the controller 70 uses the ion sensing system 84 to monitor the ion sense signal for a misfire. At 212, the controller 70 determines whether the ion sense signal indicates that the first spark (first plug 54) resulted in a misfire.

When false, the method 200 proceeds to 216 where normal fueling control continues on subsequent combustion cycles and the method 200 then ends or returns to 204. When true, the method 200 proceeds to 220.

At 220, the controller 70 uses the ion sensing system 84 to monitor the ion sense signal (i.e., an extended window of the ion sense signal) for an exhaust stroke heat release. At 224, the controller 70 determines whether the ion sense signal indicates that the exhaust stroke heat release occurred. As previously discussed, the ion sensing system 84 can be configured to generate an ion sense signal indicative of ion flow between the sets of electrodes of both the first spark plug 54 and the second spark plug 60 (e.g., during separate periods). This exhaust stroke heat release corresponds to a late cycle partial combustion of the primary fuel/air charge, which is indicative of a partial burn and remaining fuel/air mixture that could cause pre-ignition during a subsequent combustion cycle. When step 224 is false, the method 200 proceeds to 216. When step 224 is true, the method 200 proceeds to 228. At 228, the controller 70 performs alternative (i.e., non-normal) fuel control (decreased fuel/air ratio or amount of fuel, disabled fueling, etc.) for a calibratable number of subsequent combustion cycles to prevent pre-ignition and the method 200 ends or returns to 204.

It will be appreciated that the terms "controller" and "control system" as used herein refer to any suitable control device(s) that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A pre-ignition prevention system for a turbulent jet ignition (TJI) engine having dual spark plugs, the pre-ignition prevention system comprising:
   an ion sensing system configured to generate an ion sense signal indicative ion flow between electrodes of each of first and second spark plugs of the TJI engine, the first and second spark plugs being associated with a pre-chamber and a main chamber, respectively, of a cylinder of the TJI engine; and
   a controller configured to:
      receive the ion sense signal from the ion sensing system;
      detect, using the ion sense signal, a misfire event where a firing of the first spark plug fails to completely combust a fuel/air pre-charge in the pre-chamber;
      in response to detecting the misfire event, detect, using the ion sense signal, an exhaust stroke heat release event after a firing of the second spark plug indicative of a remaining portion of a primary fuel/air charge in the main chamber; and
      in response to detecting the exhaust stroke heat release event, adjust fueling for at least one subsequent combustion cycle to prevent pre-ignition of the remaining portion of the primary fuel/air charge in the main chamber.

2. The pre-ignition prevention system of claim 1, wherein the controller is configured to adjust the fueling by decreasing a fuel/air ratio of the TJI engine or decreasing a quantity of fuel injected into the TJI engine.

3. The pre-ignition prevention system of claim 1, wherein the controller is configured to adjust the fueling by temporarily disabling fueling to the TJI engine.

4. The pre-ignition prevention system of claim 1, wherein the controller is configured to adjust the fueling by increasing a fuel/air ratio of the TJI engine or increasing a quantity of fuel injected into the TJI engine.

5. The pre-ignition prevention system of claim 1, wherein the controller is configured to adjust the fueling for a calibrated number of subsequent combustion cycles, and wherein the calibrated number of subsequent combustion cycles is calibrated to ensure that the remaining portion of the primary fuel/air charge in the main chamber is completely combusted.

6. The pre-ignition prevention system of claim 1, wherein the controller is configured to extend a monitoring window for the ignition sense signal to include a period after the firing of the second spark plug in order to monitor for the exhaust stroke heat release event.

7. The pre-ignition prevention system of claim 6, wherein the exhaust stroke heat release event corresponds to a late cycle partial combustion of the primary fuel/air charge, and wherein the late cycle partial combustion of the primary fuel/air charge results in an incomplete combustion of the primary fuel/air charge and the remaining portion of the primary fuel/air charge.

8. The pre-ignition prevention system of claim 1, wherein the pre-ignition of the remaining portion of the primary fuel/air charge causes excessive vibration that could potentially damage the TJI engine.

9. The pre-ignition prevention system of claim 1, wherein the TJI engine is a four-cylinder turbocharged engine.

10. A pre-ignition prevention method for a turbulent jet ignition (TJI) engine having dual spark plugs, the pre-ignition prevention method comprising:
   generating, by an ion sensing system, an ion sense signal indicative ion flow between electrodes of each of first and second spark plugs of the TJI engine, the first and second spark plugs being associated with a pre-chamber and a main chamber, respectively, of a cylinder of the TJI engine;
   receiving, by a controller of the TJI engine, the ion sense signal from the ion sensing system;
   detecting, by the controller and using the ion sense signal, a misfire event where a firing of the first spark plug fails to completely combust a fuel/air pre-charge in the pre-chamber;
   in response to detecting the misfire event, detecting, by the controller and using the ion sense signal, an exhaust stroke heat release event after a firing of the second spark plug indicative of a remaining portion of a primary fuel/air charge in the main chamber; and
   in response to detecting the exhaust stroke heat release event, adjusting, by the controller, fueling for at least one subsequent combustion cycle to prevent pre-ignition of the remaining portion of the primary fuel/air charge in the main chamber.

11. The pre-ignition prevention method of claim 10, wherein the adjusting of the fueling includes decreasing a fuel/air ratio of the TJI engine or decreasing a quantity of fuel injected into the TJI engine.

12. The pre-ignition prevention method of claim 10, wherein the adjusting of the fueling includes temporarily disabling fueling to the TJI engine.

13. The pre-ignition prevention method of claim 10, wherein the adjusting of the fueling includes increasing a fuel/air ratio of the TJI engine or increasing a quantity of fuel injected into the TJI engine.

14. The pre-ignition prevention method of claim 10, wherein the adjusting of the fueling is performed for a calibrated number of subsequent combustion cycles, and wherein the calibrated number of subsequent combustion cycles is calibrated to ensure that the remaining portion of the primary fuel/air charge in the main chamber is completely combusted.

15. The pre-ignition prevention method of claim 10, further comprising extending, by the controller, a monitoring window for the ignition sense signal to include a period after the firing of the second spark plug in order to monitor for the exhaust stroke heat release event.

16. The pre-ignition prevention method of claim 15, wherein the exhaust stroke heat release event corresponds to a late cycle partial combustion of the primary fuel/air charge, and wherein the late cycle partial combustion of the primary fuel/air charge results in an incomplete combustion of the primary fuel/air charge and the remaining portion of the primary fuel/air charge.

17. The pre-ignition prevention method of claim 10, wherein the pre-ignition of the remaining portion of the primary fuel/air charge causes excessive vibration that could potentially damage the TJI engine.

18. The pre-ignition prevention method of claim 10, wherein the TJI engine is a four-cylinder turbocharged engine.

* * * * *